United States Patent [19]

Murakami et al.

[11] Patent Number: 4,533,683
[45] Date of Patent: Aug. 6, 1985

[54] RUST PREVENTIVE CATIONIC ELECTROCOATING

[75] Inventors: Ryoichi Murakami, Nara; Yoshiyuki Uyeda, Nishinomiya; Kanji Nishijima, Ibaraki; Tetsuo Yanagihara, Neyagawa, all of Japan

[73] Assignee: Nippon Paint Co., Ltd., Osaka, Japan

[21] Appl. No.: 489,082

[22] Filed: Apr. 27, 1983

[30] Foreign Application Priority Data

Apr. 28, 1982 [JP] Japan ................................. 57-72257

[51] Int. Cl.$^3$ ............................................... C08K 3/10
[52] U.S. Cl. .................................... 523/414; 523/415; 523/458
[58] Field of Search ...................... 523/414, 458, 415; 524/407

[56] References Cited

U.S. PATENT DOCUMENTS 3,954,693  5/1976  Fong .................................... 523/458
4,312,800  1/1982  Jasenof et al. ...................... 524/407
4,443,569  4/1984  Schroder et al. ................... 523/414

FOREIGN PATENT DOCUMENTS 3315285  11/1983  Fed. Rep. of Germany ...... 524/407

Primary Examiner—Lewis T. Jacobs
Attorney, Agent, or Firm—Wenderoth, Lind & Ponack

[57] ABSTRACT

A method for cationic electrocoating which comprises electrocoating a substrate in an electrocoating composition comprising an electrocoating resin having a reactive group admixed with a paste comprising a chromate pigment in a water-insoluble or hardly soluble, reactive group-containing organic binder and said paste having a water content of not more than 2% by weight and said composition having a concentration of 200 to 5,000 ppm in terms of $CrO_3$, the reactive group in the electrocoating resin being crosslinkable with the reactive group in the organic binder. The formed electrocoating film has high rust prevention.

2 Claims, No Drawings

RUST PREVENTIVE CATIONIC ELECTROCOATING

The present invention relates to rust preventive cationic electrocoating. More particularly, it relates to a rust preventive cationic electrocoating composition and a method for formation of a rust preventive coating film with the same.

Automobiles are used under greatly varied severe weather conditions and their bodies are required to have a high degree of rust prevention. This is particularly true for automobiles to be used in cold places where salts are often spread over roads to melt snow in the winter season. In order to provide automobile bodies with high rust prevention, some proposals were recently made on materials and coating technique. With respect to materials, for instance, cold-rolled sheet steel was replaced by zinc-coated sheet steel, and with respect to coating technique, anionic electrocoating for formation of a primer coating film was replaced by cationic electrocoating. Although these replacements produced a considerable improvement of the rust preventive property, the corrosion resistance of the cationic electrocoating film on a zinc-coated sheet steel and the rust prevention in pocket areas are not satisfactory under wet corrosive conditions.

For enhancement of the rust preventive property of a coating film, a chromate pigment is sometimes incorporated as a rust preventive agent into a coating composition. When this technique is applied to a cationic electrocoating composition, the basic group of the resinous material contained in the composition interacts with the chromate ion dissociated from the chromate pigment to cause the agglomeration of the resinous material and increase the viscosity of the composition so that the coated surface becomes rough and a sufficient rust preventive effect is not produced. To solve this problem, it was proposed to encapsulate a chromate pigment with an organic resinous compound to form microcapsules so as to prevent the interaction between the resinous material in a cationic electrocoating composition and the chromate pigment on the electrocoating and melt the organic resinous compound as the capsulating material on baking so as to impart a rust preventive property to the resultant coating film (Japanese Patent Publication (unexamined) No. 151,227/1975). However, this technique requires a particular microcapsulating procedure and troublesome, complicated operations. In addition, the capsulating material is not always suitably reactive with the resinous material in the coating composition so that the formation of a defective coating film with orange peel or seedling is frequently observed.

As a result of extensive study, it has now been found that by the use of a cationic electrocoating composition comprising an electrocoating resin having a reactive group incorporated with a paste of a chromate pigment in a reactive group-containing organic binder, the reactive group in the electrocoating resin being crosslinkable with the reactive group in the organic binder, the electrocoating of a substrate can effectively be performed with the formation of a coating film having an excellent rust preventive property and a smooth surface.

The present invention provides a cationic electrocoating composition for formation of a rust preventive coating film on a substrate which comprises an electrocoating resin having a reactive group admixed with a paste comprising a chromate pigment in a water-insoluble or hardly soluble, reactive group-containing organic binder and said paste having a water content of not more than 2% by weight and a $CrO_3$ concentration such as to make the concentration in the electrocoating composition 200 to 5000 ppm in terms of $CrO_3$, the reactive group in the electrocoating resin being crosslinkable with the reactive group in the organic binder. It also provides a method for electrocoating a substrate with a cationic electrocoating composition to form a rust preventive coating film thereon by the use of the said cationic electrocoating composition.

As the chromate pigment, there may be used barium chromate, zinc chromate, strontium chromate, lead chromate, calcium chromate, barium potassium chromate ($BaK_2(CrO_4)_2$), etc. Any other chromate pigment may be also used insofar as it has a sufficient rust preventive property.

The reactive groups in the electrocoating resin and the organic binder may be ones which are reacted each other on baking to form a urethane or urea bond. When, for instance, the reactive group in the organic binder is a blocked isocyanate group, the reactive group in the electrocoating resin may be a hydroxyl group, a primary amino group or a secondary amino group. When the reactive group in the organic binder is a hydroxyl group, a primary amino group or a secondary amino group, the reactive group in the electrocoating resin may be a blocked isocyanate group.

The organic binder may be usually one having a molecular weight of 300 to 50,000, preferably from 500 to 10,000. The organic binder having a blocked isocyanate group as the reactive group may be polyisocyanates such as aliphatic or aromatic diisocyanates (e.g. m-phenylene diisocyanate, p-phenylene diisocyanate, 4,4'-diphenylmethane diisocyanate, 2,4-tolylene diisocyanate, 2,6-tolylene diisocyanate, m-xylylene diisocyanate, p-xylylene diisocyanate, hexamethylene diisocyanate, dimeric acid diisocyanate, isophorone diisocyanate), addition products of said diisocyanates in excessive amounts with polyols (e.g. ethylene glycol, propylene glycol, glycerol, trimethylol propane, pentaerythritol), trimers of said diisocyanates, etc., in which the isocyanate groups are blocked. As the blocking agent for the isocyanate groups, a volatile, low molecular weight, active hydrogen-containing compound can be used. Specific examples are aliphatic or aromatic monohydric alcohols (e.g. methanol, ethanol, propanol, butanol, hexanol, cyclohexanol, benzyl alcohol, ethylene glycol monoethyl ether, ethylene glycol monobutyl ether), hydroxy tertiary amines (e.g. dimethylaminoethanol, diethylaminoethanol), oximes (e.g. acetoxime, methyl ethyl ketoxime), phenol, cresol, etc.

The organic binder having a hydroxyl group, a primary amino group or a secondary amino group as the reactive group may be chosen from polymers of alkylene oxides (e.g. propylene oxide, butylene oxide), polyol type derivatives such as addition products of polyhydric alcohols (e.g. ethylene glycol, propylene glycol, glycerol, trimethylolpropane) to alkylene oxides, polyamides prepared from dicarboxylic acids (e.g. phthalic acid, adipic acid, sebacic acid, dimeric acid, etc.) and polyamines (e.g. ethylenediamine, hexamethylenediamine, diethylenetriamine, triethylenetetramine, propylenediamine, butylenediamine), hydroxypolyesters prepared from organic acids (e.g. phthalic acid, adipic acid, maleic acid) and polyhydric alcohols (e.g. ethylene glycol, trimethylolpropane, glycerol, trimethylolethane, pentaerythritol), polylactonepolyols prepared by ring-opening polymerization of lactones (e.g. ε-caprolactone, α-methyl-ε-caprolactone) in the presence of polyhydric alcohols (e.g. ethylene glycol, trimethylol propane), etc.

The chromate pigment may be dispersed in the organic binder, usually in a weight proportion of 1:0.1 or more, preferably of 1:0.5–3 (particularly 1:1–2), by means of a conventional mixing apparatus such as sand mill or ball mill under the conditions where the water content is not more than 2% by weight to make a paste. When the water content is more than 2% by weight, the paste becomes viscous, and the dispersibility of the chromate pigment is deteriorated. Further, the chromate pigment dissociates to liberate chromate ion, which interacts with the electrocoating resin to cause the agglomeration of the electrocoating resin and increase the viscosity of the composition. Thus, the stability of the composition is deteriorated. In general, the paste is preferred to have a viscosity of 500 to 50,000 cp, particularly 1,000 to 20,000 cp. When the viscosity is higher than 50,000 cp, the uniform mixing will become difficult; in such case, an appropriate organic solvent such as a cellosolve (e.g. methyl cellosolve, ethyl cellosolve, butyl cellosolve, isoamyl cellosolve) may be incorporated therein to make the viscosity within the said range.

The amount of the paste of the chromate pigment to be incorporated into the electrocoating composition may be such as to make the concentration 200 to 5000 ppm in terms of $CrO_3$. When the concentration is less than 200 ppm, the desired rust preventive effect is not exerted. When the concentration is more than 5,000 ppm, abnormalities such as orange peel are observed on the coating film.

The incorporation of the paste into the electrocoating composition is normally effected during the preparation of the coating composition. Alternatively, the incorporation may be made to either one of the coating compositions before or after diluting.

When the paste is incorporated into the coating composition, the former may be used as such. Alternatively, the former may be previously admixed with a water-soluble or dispersible nonionic or cationic surface active material. In such case, the weight proportion of the organic binder in the paste and the solid component in the surface active material may be may be usually 1:0.1–5, preferably 1:0.5–1.

The electrocoating composition into which the paste is to be incorporated may be any conventional one, for instance, as disclosed in Japanese Patent Publication Nos. 3678/1977 and 23313/1980. The electrocoating resin in such composition may be also any conventional one. Typical examples are epoxy-modified amino resins (Japanese Patent Publication Nos. 47143/1978 and 4978/1979 and Japanese Patent Publication (unexamined) Nos. 86735/1978 and 93024/1979), amino-modified polyurethanepolyol resins (Japanese Patent Publication (unexamined) Nos. 15449/1979 and 115476/1980) and sulfonium or phosphonium group-containing resins.

As the substrate to which the composition of the invention is applicable, there are exemplified iron, steel, zinc-coated steel, aluminum, their alloys, etc. Preferably employed is zinc-coated sheet steel such as zinc electroplated sheet steel, hot dipped galvanized sheet steel, alloyed zinc coated sheet steel or sheet steel plated with zinc containing at least one of nickel, cobalt, manganese, iron and aluminum. Prior to the application of the electrocoating, the substrate is usually subjected to pre-treatment by a conventional procedure. For instance, the substrate is previously cleaned or defatted and phosphated.

When the pre-treated substrate is electrocoated with the rust preventive cationic electrocoating composition of the invention according to a per se conventional cationic electrocoating procedure (cf. Japanese Patent Publication Nos. 3678/1977 and 23313/1980), there is formed a electrocoating film. After baking, such electrocoating film shows high corrosion resistance and good throwing power. In case of the substrate being a zinc-coated sheet steel, it is particularly notable that no roughness is observed at the surface and excellent resistance to salt spraying is produced.

The present invention will be hereinafter explained further in detail by the following Examples, in which parts and % are by weight unless otherwise indicated. The terms "chromate pigment dispersion" and "Dispersion" have the same meaning as "chromate pigment paste" and "Paste".

EXAMPLE 1

Preparation of a chromate pigment dispersion

A chromate pigment ((a) barium chromate, (b) strontium chromate, (c) lead chromate or (d) zinc chromate) was dispersed in polypropylenetetraol (molecular weight, 1,000; water content, 0.03%) as the organic binder by means of glass beads having an average diameter of 2 mm. The weight ratio of the chromate pigment, the organic binder and the glass beads was 1:1:2. The components were mixed for 2 hours to make the average particle size of the chromate pigment around 10 microns. Then, the glass beads were filtered off to obtain a chromate pigment dispersion (hereinafter referred to as "Dispersion I(a)" for barium chromate, "Dispersion I(b)" for strontium chromate, "Dispersion I(c)" for lead chromate or "Dispersion I(d)" for zinc chromate).

Preparation of a cationic electrocoating composition

Diglycidyl ether of Bisphenol A (epoxy equivalent 910) (1,000 parts) was dissolved in ethylene glycol monoethyl ether (463 parts) at 70° C. while stirring, and diethylamine (80.3 parts) was added thereto. Then, the addition reaction was carried out at 100° C. for 2 hours to obtain a resin (hereinafter referred to as "Resin A").

Polyisocyanate ("Coronate L" manufactured by Nippon Polyurethane K.K.; nonvolatile component having 13% of NCO groups, 75%) (875 parts) was admixed with dibutyl tin laurate (0.05 part), and the resultant mixture was heated to 50° C. After addition of 2-ethylhexanol (390 parts), the resulting mixture was heated at 120° C. for 90 minutes. The reaction mixture was diluted with ethylene glycol monoethyl ether (130 parts) to obtain a resin (hereinafter referred to as "Resin B").

A mixture of Resin A (1,000 parts) and Resin B (400 parts) was neutralized with glacial acetic acid (30 parts) and diluted with deionized water (570 parts) to obtain a vehicle (hereinafter referred to as "Resinous vehicle C") containing 50% of nonvolatile components.

Then, Resinous vehicle C (150 parts), glacial acetic acid (0.8 part), titanium oxide (100 parts), basic lead silicate (20 parts), carbon black (30 parts) and deionized water (150 parts) were mixed to obtain a paste (hereinafter referred to as "Pigment paste D").

Preparation of a rust preventive cationic electrocoating composition

To Resinous vehicle C (500 parts), butyl tin laurate (6 parts), Dispersion I(a), I(b), I(c) or I(d) (25 parts), Pigment paste D (300 parts) and deionized water (1,169 parts) were added in order to obtain a rust preventive cationic electrocoating composition. The contents of $CrO_3$ in the composition was 2,400 ppm, 3,100 ppm, 900 ppm and 2,800 ppm in cases of Dispersions I(a), I(b), I(c) and I(d), respectively.

Cationic electrocoating

A cold-rolled sheet steel, an alloyed hot dipped galvanized sheet steel (zinc deposition, 45 g/m$^2$) or an Zn-Ni complex electroplated sheet steel (Zn-Ni deposition, 20 g/m$^2$) as previously zinc phosphated was electrocoated in the rust preventive preventive cationic electrocoating composition to form a coating film of 20 microns in thickness. The coated steel was washed with water and baked at 180° C. for 30 minutes.

Using the coated steel as a test piece, the physical properties of the coating film were measured. The results are shown in Table 1.

EXAMPLE 2

Preparation of a chromate pigment dispersion

As the chromate pigment, strontium chromate was used, and as the organic binder, (a) Resin B as prepared in Example 1 (polyisocyanate blocked with 2-ethylhexanol; water content, 0.8%; water insoluble), (b) "Epikote 828" (diglycidyl ether of Bisphenol A; distributed by Yuka Shell Epoxy Co., Ltd.; molecular weight, 376; water content, 0.03%; water insoluble), (c) "Versamide 100" (dimeric acid-base polyamide resin; distributed by Henkel Japan; amine value, 90; water content, 0.5%; water insoluble) or (d) "Methylone resin 75108" (aryl ether of methylolphenol; manufactured by General Electric Corporation; water content, 0.2%; water insoluble) was used. Further, ethylene glycol aminobutyl ether (water content, 0.1%) was used as an auxiliary agent.

The chromate pigment, the organic binder, the auxiliary agent and the glass beads as in Example 1 were mixed together in a weight proportion of 1:1:1:3 and dispersed for 2 hours to make the particle size of the chromate pigment around 10 microns. The glass beads were filtered off to obtain the chromate pigment dispersion (hereinafter referred to as "Dispersion II(a)" for Component B, "Dispersion II(b)" for Epikote 828, Dispersion II(c)" for Versamide 100 and "Dispersion II(d)" for Methylone resin).

Preparation of a rust preventive cationic electrocoating composition

In the same manner as in Example 1 but using Dispersion II(a), II(b), II(c) or II(d) (each 25 parts) in place of Dispersion I, a rust preventive cationic coating composition was prepared. In this Example, the content of $CrO_3$ in the composition was 2,100 ppm.

Cationic electrocoating

In the same manner as in Example 1 but using the rust preventive cationic electrocoating composition as prepared above, cationic electrocoating was carried out. The physical properties of the formed coating film were examined and shown in Table I.

EXAMPLE 3

Dispersion I(b) as the chromate pigment dispersion and, as an auxiliary agent, (a) "Inogen EA 140" (polyethylene glycol nonylphenyl ether; manufactured by Daiichi Kogyo Seiyaku) or (b) a hydroxy quaternary ammonium group-containing epoxy resin (as disclosed in Japanese Patent Publication No. 34236/1981) were mixed in a weight ratio of 1:1 to obtain a dispersion (hereinafter referred to as "Dispersion III(a)" or "Dispersion III(b)").

Resinous vehicle C as prepared in Example 1 (500 parts), butyl tin laurate (6 parts), Pigment paste D (300 parts) and deionized water (1,194 parts) were mixed to obtain a cationic electrocoating composition. Into the composition, Dispersion III(a) or Dispersion III(b) (each 50 parts) was incorporated to make a rust preventive cationic electrocoating composition. The content of $CrO_3$ in the composition was 3,100 ppm.

In the same manner as in Example 1 but using the rust preventive cationic electrocoating composition as prepared above, cationic electrocoating was carried out. The physical properties of the formed coating film were examined and shown in Table 1.

COMPARATIVE EXAMPLE 1

Resinous vehicle C as prepared in Example 1 (500 parts), Pigment paste D (300 parts), butyl tin laurate (6 parts) and deionized water (1,194 parts) were mixed to obtain a cationic electrocoating composition.

In the same manner as in Example 1 but using the cationic electrocoating composition as prepared above, cationic electrocoating was carried out. The physical properties of the formed coating film were examined and shown in Table 1.

COMPARATIVE EXAMPLE 2

Resinous vehicle C as prepared in Example 1 (150 parts), glacial acetic acid (0.8 part), titanium oxide (88 parts), basic lead silicate (18 parts), carbon black (26 parts), strontium chromate (18 parts) and deionized water (150 parts) were mixed to obtain a paste (hereinafter referred to as "Pigment paste E").

In the same manner as in Example 1 but using Pigment paste E in place of Pigment paste D, a cationic electrocoating composition was prepared. The content of $CrO_3$ in the composition was 3,100 ppm.

In the same manner as in Example 1 but using the cationic electrocoating composition as prepared above, cationic electrocoating was carried out. The physical properties of the formed coating film were examined and shown in Table 1.

COMPARATIVE EXAMPLE 3

In the same manner as in Comparative Example 1 but using lead chromate (18 parts) in place of strontium chromate, a cationic electrocoating composition was prepared. The content of $CrO_3$ in the composition was 900 ppm.

In the same manner as in Example 1 but using the cationic electrocoating composition as prepared above, cationic electrocoating was carried out. The physical properties of the formed coating film were examined and shown in Table 1.

COMPARATIVE EXAMPLE 4

In the same manner as in Japanese Patent Publication (unexamined) No. 151227/1975, a rust preventive agent comprising microcapsules of strontium chromate and "Tamanol 510" (manufactured by Arakawa Rinsan Kagaku Kogyo K.K.). The content of strontium chromate in the agent was 37.5%.

Resinous vehicle C (150 parts), glacial acetic acid (0.8 part), titanium oxide (88 parts), basic lead silicate (18 parts), carbon black (26 parts), the rust preventive agent prepared above (948 parts) and deionized water (120 parts) were mixed together to obtain a paste (hereinafter referred to as "Pigment paste F").

In the same manner as in Comparative Example 1 but using Pigment paste F in place of Pigment paste D, an electrocoating composition was prepared. The content of $CrO_3$ in the composition was 3,100 ppm.

In the same manner as in Example 1 but using the electrocoating composition as prepared above, cationic electrocoating was carried out. The physical properties of the formed coating film was examined and shown in Table 1.

TABLE 1

| Example No. | Chromate pigment dispersion | Resistance to salt spraying (800 hours) | | | Coating film performance after 1 month at 40° C. | | |
|---|---|---|---|---|---|---|---|
| | | Cold-rolled sheet steel (zinc-phosphated) (mm) | Alloyed hot dipped galvanized sheet steel (zinc-phosphated) (mm) | Zn—Ni complex electroplated sheet steel (zinc-phosphated) (mm) | 300 Mesh filtrability | Appearance | Throwing power (cm) |
| 1 | Dispersion I-1 | 1.5–2.5 | 1.0–2.5 | 1.0–2.0 | Good | Smooth | 23 |
| | Dispersion I-2 | 1.5–2.0 | 1.0–2.0 | 1.0–1.5 | Good | Smooth | 24 |
| | Dispersion I-3 | 1.5–2.5 | 1.5–3.0 | 1.5–2.5 | Good | Smooth | 23 |
| | Dispersion I-4 | 1.5–2.5 | 1.0–2.0 | 1.0–1.5 | Good | Smooth | 24 |
| 2 | Dispersion II-1 | 1.5–2.5 | 1.0–2.5 | 1.0–2.0 | Good | Smooth | 24 |
| | Dispersion II-2 | 1.5–2.5 | 1.0–2.5 | 1.0–2.0 | Good | Smooth | 24 |
| | Dispersion II-3 | 1.5–2.5 | 1.5–2.5 | 1.5–2.0 | Good | Smooth | 24 |
| | Dispersion II-4 | 1.5–2.5 | 1.0–2.5 | 1.0–2.0 | Good | Smooth | 24 |
| 3 | Dispersion III-1 | 1.5–2.5 | 1.0–2.5 | 1.0–2.0 | Good | Smooth | 24 |
| | Dispersion III-2 | 1.5–2.5 | 1.0–2.5 | 1.0–2.0 | Good | Smooth | 24 |
| Comparative 1 | — | 2.0–3.5 | 2.0–6.0 | 2.5–6.5 | Good | Smooth | 19 |
| Comparative 2 | — | 2.0–5.0 (spot rust observed) | 2.0–3.0 | 2.0–3.5 | Not good (coagulates observed) | Rough | 22 |
| Comparative 3 | — | 2.0–3.0 | 2.0–4.0 | 2.0–4.0 | Not good (coagulates observed) | Rough | 22 |
| Comparative 4 | — | 1.5–3.0 | 3.0–5.0 | 2.0–5.0 | Good | Rough (many blocks) | 19 |

What is claimed is:

1. A rust preventive cationic electrocoating composition which comprises an electrocoating resin having a reactive group admixed with a paste comprising a chromate pigment in a water-insoluble or hardly soluble organic binder having a reactive group, said paste having a water content of not more than 2% and $CrO_3$ content such as to make the concentration of $CrO_3$ in the electrocoating composition 200 to 5000 ppm;

the reactive group in the electrocoating resin being crosslinkable with the reactive group in the organic binder;

the reactive group in the organic binder being a blocked isocyanate group, and the reactive group in the electrocoating resin being a hydroxyl group, a primary amino group or a secondary amino group; or the reactive group in the organic binder being a hydroxyl group, a primary amino group or a secondary amino group and the reactive group in the electrocoating resin being a blocked isocyanate group.

2. The composition according to claim 1, wherein the chromate pigment is the one selected from barium chromate, zinc chromate, strontium chromate, lead chromate, calcium chromate or barium potassium chromate.

* * * * *